United States Patent
Nakano et al.

(10) Patent No.: US 8,731,825 B2
(45) Date of Patent: May 20, 2014

(54) TRAJECTORY DISPLAY DEVICE

(75) Inventors: Mikiya Nakano, Okazaki (JP); Kenji Tsuji, Gifu (JP); Kiyohiko Sawada, Nagoya (JP); Mitsuhisa Hayashi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 520 days.

(21) Appl. No.: 13/030,876

(22) Filed: Feb. 18, 2011

(65) Prior Publication Data

US 2011/0208422 A1    Aug. 25, 2011

(30) Foreign Application Priority Data

Feb. 22, 2010   (JP) .................................. 2010-36468
Jan. 12, 2011   (JP) .................................. 2011-4043

(51) Int. Cl.
    *G01C 21/26*     (2006.01)
(52) U.S. Cl.
    USPC ................ 701/469; 701/468; 340/995.14
(58) Field of Classification Search
    None
    See application file for complete search history.

(56) References Cited

U.S. PATENT DOCUMENTS

| 4,535,335 | A  |   | 8/1985  | Tagami et al. |
| 4,663,629 | A  |   | 5/1987  | Tagami et al. |
| 4,734,845 | A  | * | 3/1988  | Kawamura et al. ............ 700/17 |
| 5,220,507 | A  | * | 6/1993  | Kirson .......................... 701/533 |
| 6,334,344 | B1 | * | 1/2002  | Bonhoure et al. ............... 70/11 |
| 6,415,223 | B1 | * | 7/2002  | Lin et al. ....................... 701/431 |
| 6,856,903 | B2 | * | 2/2005  | Ishigami et al. ............. 701/480 |
| 6,892,134 | B2 | * | 5/2005  | Lacey et al. ................. 701/428 |
| 7,706,976 | B1 | * | 4/2010  | Peake ........................... 701/512 |
| 7,711,476 | B2 | * | 5/2010  | Chiou et al. .................. 701/480 |
| 7,848,881 | B2 | * | 12/2010 | Tan et al. ....................... 701/469 |
| 7,991,576 | B2 | * | 8/2011  | Roumeliotis ................. 702/159 |
| 8,135,414 | B2 | * | 3/2012  | Khokhar .................... 455/456.1 |
| 2002/0177950 | A1 | * | 11/2002 | Davies .......................... 701/213 |
| 2005/0075116 | A1 | * | 4/2005  | Laird et al. ................. 455/456.3 |
| 2007/0260397 | A1 | * | 11/2007 | Kurata .......................... 701/213 |
| 2008/0021648 | A1 | * | 1/2008  | Wilson ......................... 701/301 |
| 2010/0002908 | A1 | * | 1/2010  | Miyamoto et al. ............ 382/103 |
| 2011/0057599 | A1 | * | 3/2011  | Iwashita et al. ............... 318/601 |

FOREIGN PATENT DOCUMENTS

| JP | A-H08-278150 | 10/1996 |
| JP | 2001-101597 A | 4/2001 |
| JP | 2001-272238 A | 10/2001 |
| JP | 2004-272426 A | 9/2004 |
| JP | A-2005-208466 | 8/2005 |
| WO | WO 2009/156429 A1 | * 12/2009 |

OTHER PUBLICATIONS

OA mailed Jun. 18, 2013 in the corresponding JP application No. 2011-004043 (English translation).

* cited by examiner

*Primary Examiner* — Helal A Algahaim
*Assistant Examiner* — Donald J Wallace
(74) *Attorney, Agent, or Firm* — Posz Law Group, PLC

(57) ABSTRACT

A trajectory display device includes: a display element; a current position detector; a memory for storing the current position successively; and a position determination unit for determining a plurality of certain actual distance trajectory points and a plurality of direction change points based on position data stored in the memory. The certain actual distance trajectory points are arranged at every actual distance defined by a scale of a map. The moving body changes a moving direction at each direction change point. The display element displays the trajectory including the certain actual distance trajectory points and the direction change points, which is overlapped over the map.

14 Claims, 4 Drawing Sheets

TRAJECTORY DISPLAY DEVICE

CROSS REFERENCE TO RELATED APPLICATIONS

This application is based on Japanese Patent Applications No. 2010-36468 filed on Feb. 22, 2010, and No. 2011-4043 filed on Jan. 12, 2011, the disclosures of which are incorporated herein by reference.

FIELD OF THE INVENTION

The present invention relates to a trajectory display device mounted on a moving body such as a vehicle or on a mobile element carried by a user. The trajectory display device displays a trajectory of the moving body or the mobile element.

BACKGROUND OF THE INVENTION

A moving trajectory display device is disclosed in JP-A-H08-278150. The device writes data of a position of a vehicle at every first traveling distance in a traveling trajectory memory so that the memory stores the traveling trajectory. The first traveling distance is 160 meters. Then, the traveling trajectory is overlapped on a map so that the device displays the trajectory over the map image on a display screen. When a traveling direction is changed by a predetermined angle or more, and the vehicle travels the second traveling distance from a position, at which the device previously wrote the data in the memory, the device writes the current position in the memory even if the vehicle does not travel the first traveling distance from the position, at which the device previously wrote the data in the memory. Here, the second traveling distance is 40 meters. Accordingly, when roads in a narrow area are confusing like a maze, i.e., when the roads are crossed at short distances, the device writes the data at short intervals, and the device displays the traveling trajectory. Thus, even when the vehicle drives in the region in which the roads are confusing like a maze, the device correctly displays the traveling trajectory.

In the above device, when the traveling direction is changed by a predetermined angle or more, the device writes the current position in the memory at every second traveling distance, regardless of a scale of the map displayed on the display screen. Further, the device displays the traveling trajectory. Accordingly, when the scale of the map is comparatively small, circles for showing the traveling trajectory are densely displayed on the map, and therefore, it is, hard to see the traveling trajectory.

Here, when the device does not switches from the first traveling distance to the second traveling distance so that the device writes the data in the memory at every first distance, the distance between the circles for showing the trajectory becomes wide. Therefore, the reduction of identification of the circles is improved. However, in this case, it is difficult to determine the actual trajectory.

SUMMARY OF THE INVENTION

In view of the above-described problem, it is an object of the present disclosure to provide a moving trajectory display device. The moving trajectory display device displays a moving trajectory, which is easily viewable for a user even if a scale of a map is small. Further, the user can determine an actual trajectory even if the scale of the map is small.

According to a first aspect of the present disclosure, a trajectory display device includes: a display element for displaying a trajectory of a moving body and a map; a current position detector for detecting a current position of the moving body successively; a memory for storing the current position successively so that a plurality of position data is stored; and a position determination unit for determining a plurality of certain actual distance trajectory points and a plurality of direction change points based on the position data stored in the memory. The certain actual distance trajectory points are arranged at every actual distance. The actual distance is defined by a first scale of the map displayed on the display element in such a manner that the actual distance in case that the first scale of the map is small is longer than the actual distance in case that the first scale of the map is large. The moving body changes a moving direction at each direction change point. The display element displays the trajectory including the certain actual distance trajectory points and the direction change points, which is overlapped over the map.

In the above device, the actual distance becomes long as the scale of the map is small. Accordingly, even when the scale of the map is small, a display distance on the display element between two adjacent certain actual distance trajectory points is sufficiently large so that the user can recognize the trajectory, i.e., the trajectory is easily viewable for the user even when the scale of the map is small. Further, the user can determine an actual trajectory even when the scale of the map is small.

According to a second aspect of the present disclosure, a trajectory display device includes: a display element for displaying a trajectory of a moving body and a map; a current position detector for detecting a current position of the moving body successively; a memory for storing the current position successively so that a plurality of position data is stored; and a position determination unit for determining a plurality of certain display distance trajectory points based on the position data stored in the memory. The certain display distance trajectory points are arranged at every actual distance corresponding to a display distance. The display element displays the trajectory including the certain display distance trajectory points, which is overlapped over the map. The display distance is defined by a distance of a display screen of the display element in such a manner that a user recognizes the trajectory prepared by the display distance.

In the above device, the display element displays the trajectory of the certain display distance trajectory points. The user recognizes the trajectory prepared by the display distance, so that it is not hard to see the trajectory, and the trajectory is easily viewable for the user even when the scale of the map is small. Further, the user can determine an actual trajectory even when the scale of the map is small.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
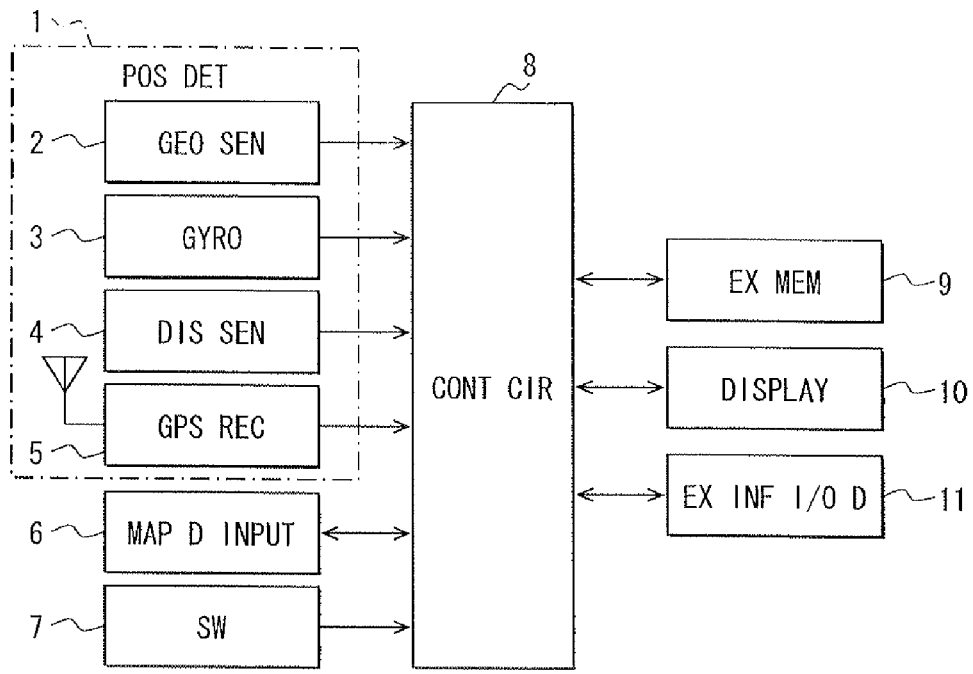
FIG. 1 is a diagram showing a navigation device having a trajectory display device.

A first embodiment of the present disclosure will be explained as follows. The first embodiment provides a navigation device having a trajectory display device. FIG. 1 shows the navigation device.

As shown in FIG. 1, the in-vehicle navigation device includes a position detector 1, a map data input element 6, operation switches 7, an external memory 9, a display device 10, an external information input/output device 11 and a control circuit 8, which couples with the position detector 1, the map data input element 6, the operation switches 7, the external memory 9, the display device 10 and the external information input/output device 11.

The control circuit 8 is a conventional computer. The control circuit 8 includes a CPU, a ROM, a RAM, a I/O element and a bus line, which couples the CPU, the ROM the RAM and the I/O element. The ROM stores a program for executing functions of the control circuit 8. According to the program, the CPU executes various processes.

The position detector 1 includes a geomagnetic sensor 2, a gyroscope 3, a distance sensor 4, a GPS receiver 5 and the like. The GPS receiver 5 is used for a GPS (i.e., global positioning system) for detecting a current position of the vehicle based on an electric wave from a satellite.

The map data input element 6 inputs map data including road data, landscape data and text data in to the control circuit 8. A memory medium for storing the map data is, for example, a hard disk drive, a flash memory, an optical disk such as a DVD-ROM or the like.

Further, the map data may be obtained from an external server via a communication network. Further, the map data may be stored in the external memory 9. In this case, with using the map data stored in the external memory 9, the device executes various navigation functions such as a map display function for display the map around the vehicle, a scale change function for changing the scale of the map, a route guidance function and the like. These functions are performed by the control circuit 8.

The operation switches 7 include, for example, a touch switch and a mechanical switch, which are integrated with the display device 10. The user input various instructions via the operation switches 7. For example, with using the operation switches 7, the user inputs a position of a destination. In this case, the navigation device automatically determines an optimum route from the current position to the destination, and displays the optimum route on the display device so that the device executes the route guidance function. A method for determining automatically the optimum route is, for example, a conventional Dijkstra method. Further, the user operates the switches 7 in order to change the scale of the map, which is displayed on the display device 10. Further, the user operates the switches 7 in order to display the traveling trajectory on the display device 10.

The external memory 9 is, for example, a memory medium such as a memory card, a hard disk drive or the like. The external memory 9 stores various data such as text data, image data, sound data, and traveling trajectory data. Further, the navigation device stores the map data when the map data is obtained from the external server.

The display device 10 is, for example, a liquid crystal display. The display device 10 displays a subject vehicle mark at a current position of the map and a road map on a display screen. The subject vehicle mark also represents a traveling direction. The road map around the vehicle is generated by the map data, which is input from the map data input element 6. Further, when the user sets the destination, the guidance-route from the current position to the destination is overlapped over the road map. Further, the trajectory figure for showing the traveling trajectory is superimposed over the map.

The external information input/output device 11 receives information such as traffic information from a VICS (i.e., vehicle information and communication system) center as an information center via a beacon or a FM radio station. The beacon is mounted along with a road, and the FM radio station is disposed in a region, in which the vehicle is disposed. The external information input/output device 11 transmits information to an external device. The received information is processed in the control circuit 8. For example, traffic jam information and traffic control information are superimposed over the map on the display device 10.

Figure 2:
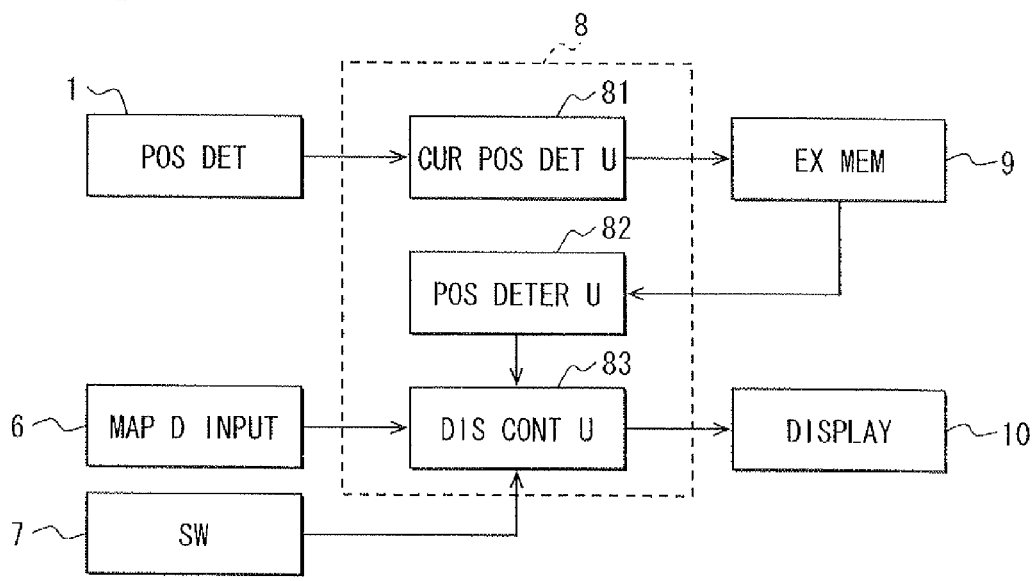
FIG. 2 is a block diagram showing a control circuit in FIG. 1.

Next, the control circuit 8 will be explained. FIG. 2 shows functions of the control circuit 8. In the control circuit 8, the CPU executes the program, which is stored in the ROM, with using a temporary memory function of the RAM. Thus, the control circuit 8 functions as a current position detection unit 81, a position determination unit 82 and a display control unit 83. The control circuit 8 further includes a destination setting unit, a route search unit, a route guide unit and the like.

The current position detection unit 81 determines the current position of the vehicle based on the signal input from the position detector 1. The geomagnetic sensor 2, the gyroscope 3, the distance sensor 4 and the GPS receiver 5 in the position detector 1 have different types of error. Accordingly, the unit 81 detects the current position based on the signals from the geomagnetic sensor 2, the gyroscope 3, the distance sensor 4 and the GPS receiver 5 with compensating the different types of error. Specifically, the unit 81 determines the current position of the vehicle according to a hybrid navigation method, which includes an electric navigation method of the GPS and an autonomous navigation method of the geomagnetic sensor 2, the gyroscope 3 and the distance sensor 4. When a certain sensor has sufficiently high accuracy, the position detector 1 may include a part of the geomagnetic sensor 2, the gyroscope 3, the distance sensor 4 and the GPS receiver 5. Alternatively, the position detector 1 may include a rotation sensor of a steering wheel, a vehicle speed sensor mounted on each wheel of the vehicle. The current position detection unit 81 determines not only the current position but also the traveling direction of the vehicle.

The current position detection unit 81 detects the current position at predetermined time intervals such as 200 microseconds, which is defined by performance of the control circuit 8. The detected current position is successively stored in the external memory 9, which functions as a position memory.

The position determination unit 82 determines a certain actual distance trajectory point and a direction change point, which constitute the trajectory figure displayed on the display device 10, according to the positions stored as the current position in the external memory 9. Here, the positions stored as the "current position" in the external memory 9 represents points through which the vehicle has traveled. A process for determining the certain actual distance trajectory point and the direction change point may be performed at a time when the user operates the switches 7 so as to execute a trajectory display instruction. Alternatively, the process for determining the certain actual distance trajectory point and the direction change point may be automatically performed at every predetermined traveling distance without depending on the trajectory display instruction.

Multiple certain actual distance trajectory points are arranged at every certain actual distance, and the certain actual distance is defined by an actual distance. The actual distance is not a distance on the display screen but the actual distance. The certain actual distance is determined by the scale of the map. Thus, when the scale of the map is small, the certain actual distance becomes long stepwise. For example, when the scale of the map is in a range between $1/5000$ and $1/20000$, the certain actual distance is set to be 50 meters. When the scale of the map is in a range between $1/40000$ and $1/80000$, the certain actual distance is set to be 100 meters. Here, when the scale of the map is $1/5000$, a scale unit of the map on the display device 10 is 50 meters, when the scale of the map is $1/20000$, a scale unit of the map on the display device 10 is 200 meters, when the scale of the map is $1/40000$, a scale unit of the map on the display device 10 is 400 meters, and when the scale of the map is $1/80000$, a scale unit of the map on the display device 10 is 800 meters.

The vehicle changes the traveling direction at the direction change point. The direction change point is determined according to the points, which are stored in the external memory 9. Specifically, the device selects a part of or all of points, which are stored at predetermined time intervals, as a candidate point of the direction change point. Here, a distance between two adjacent points stored at predetermined time intervals is narrower than a distance between two adjacent certain actual distance trajectory points. In the present embodiment, all of points stored at predetermined time intervals are set to be a candidate point of the direction change point. Alternatively, a part of points stored at predetermined time intervals may be set to be a candidate point of the direction change point. The part of points may be selected at every two consecutive points or every multiple consecutive points. Alternatively, if the distance between two adjacent points stored at predetermined time intervals is narrower than the certain actual distance, the part of points (i.e., the candidate points of the direction change point) may be selected at every predetermined distance such as every 10-meter.

Figure 3:
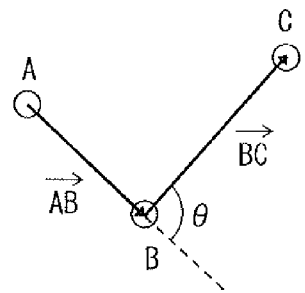
FIG. 3 is a diagram showing a method for determining with using consecutive three points whether a center candidate point is a direction change point.

After the candidate points of the direction change point are determined, three consecutive candidate points are selected, and as shown in FIG. 3, a center candidate point among the three consecutive candidate points is defined as the center candidate point B, one end candidate point is defined as the one end candidate point A, and the other end candidate point is defined as the other end candidate point C. The center candidate point B and the one end candidate point A provide a AB vector, and the center candidate point B and the other end candidate point C provide a BC vector. The traveling direction difference angle between the traveling direction shown by the AB vector and the traveling direction shown by the BC vector is defined as the traveling direction difference angle $\theta$. When the traveling direction difference angle $\theta$ is larger than a threshold value, the center candidate point B is determined as the direction change point.

The direction change point may be determined without depending on the scale of the map displayed on the display device 10. In the present embodiment, when the scale of the map is smaller than a predetermined threshold scale, the device does not specify the direction change point. The predetermined threshold scale may be a certain scale, which is set by the user or a manufacturer of the device. When the device does not specify the direction change point, the device also does not display a part of the trajectory figure corresponding to the direction change point. Thus, in this case, the trajectory figure is shown roughly so that accuracy of the trajectory figure is rough, compared with the actual trajectory. However, when the scale of the map is small, the map itself provides rough sketch of the actual structure. Thus, the trajectory figure is roughly sketched according to the scale of the map. If the scale of the map is small, and the trajectory figure is displayed in detail, a distance between parts of the trajectory figure is narrowed, and therefore, it is hard for the user to see the map. In view of the above points, the predetermined threshold scale is appropriately determined.

The display control unit 83 controls a display content of the display device 10. For example, the display control unit 83 reads out the map data such as the scale of the map, which is determined by an input signal from the switches 7, from the map data input element 6. Then, the display control unit 83 controls the display device 10 to display the map with the input scale. Further, the display control unit 83 displays the trajectory figure at the direction change point and the certain distance trajectory point on the map displayed on the display device 10 when the trajectory display instruction is input from the switches 7. The direction change point and the certain distance trajectory point are determined by the position determination unit 82.

Figure 4:
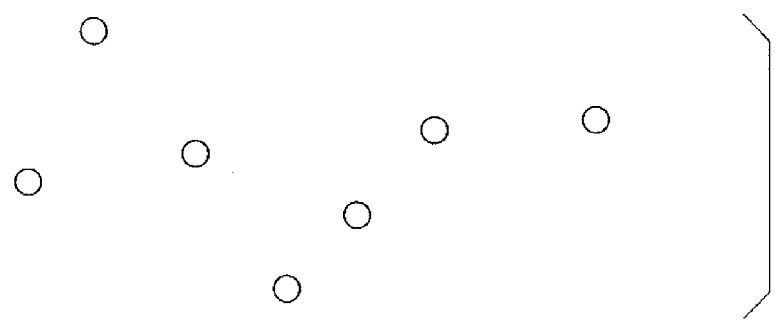
FIG. 4 is a diagram showing a trajectory figure according to a first embodiment.

Next, a display image of the trajectory figure will be explained. FIG. 4 is an example of the display image of the trajectory figure. In FIG. 4, a white circle is used for showing the trajectory figure. Alternatively, various figures such as a black circle and a white square may be used for the trajectory figure. In FIG. 4, only the white circles as the trajectory figure are shown, and the map is not shown. However, actually, the white circles as the trajectory figure superimposed over the map displayed on the display device 10.

Figure 5:
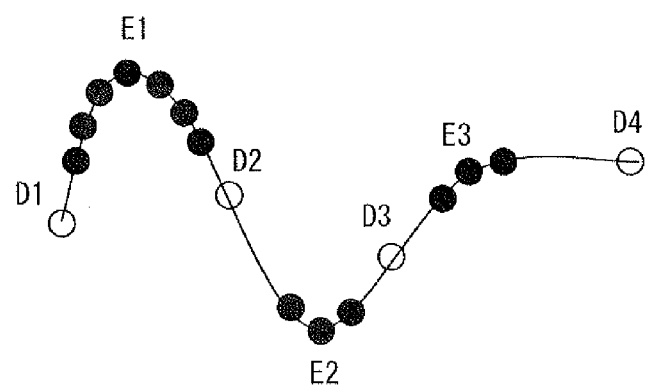
FIG. 5 is a diagram showing a method for determining whether the trajectory figure corresponds to a certain distance trajectory point or the direction change point.

FIG. 5 shows whether a white circle as the trajectory figure corresponds to a certain actual distance trajectory point or the direction change point. In FIG. 5, black circles represent the candidate points of the direction change point. In FIG. 5, only a part of the candidate points of the direction change point is shown as a matter of convenience. Actually, all candidate points of the direction change point in a whole route, which the vehicle has traveled, are stored.

In FIG. 5, the traveling direction change at the center candidate point among the consecutive three candidate points is determined, so that the device determines whether the center candidate point is the direction change point. In FIG. 5, the three candidate points E1-E3 are determined as the direction change points. The certain actual distance trajectory points D1-D4 are merely the points, which are arranged on the traveling trajectory at every predetermined actual distance. The actual distance on the traveling trajectory is calculated by integrating a distance between two adjacent points stored in the external memory 9. Thus, the certain actual distance trajectory points D1-D4 and the direction change points E1-E3 are determined and displayed as the trajectory figure in FIG. 4.

Figure 6:
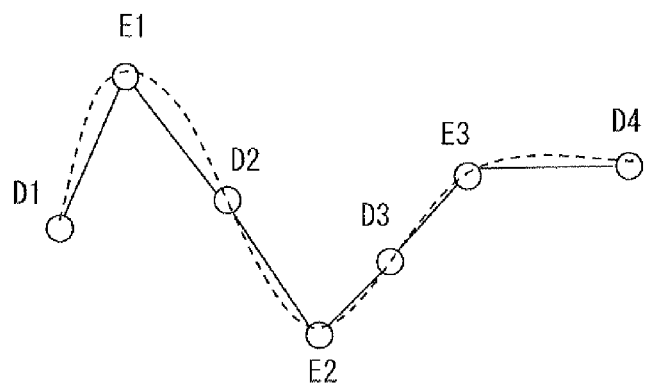
FIG. 6 is a diagram showing a display image of the trajectory figure according to the first embodiment.

FIG. 6 corresponds to FIG. 4. In FIG. 6, the position of the trajectory figure is the same as in FIG. 4. A solid line represents a straight line coupling among the white circles, and a broken line represents an actual traveling trajectory. Comparing the solid line with the broken line, when the white circle as the trajectory figure is shown at the direction change point E1-E3, the ideal trajectory determined by the trajectory figure approaches the actual traveling trajectory.

Figure 7:
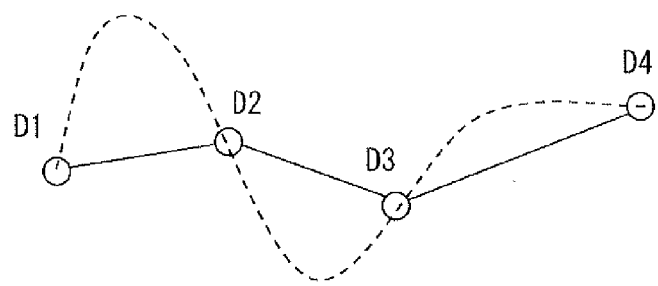
FIG. 7 is a diagram showing a trajectory figure according to a comparison device.

FIG. 7 shows a comparison trajectory figure. In FIG. 7 no direction change point is shown as the trajectory figure. Only the certain actual distance trajectory points D1-D4 are shown as the trajectory figure. In FIG. 7, a solid line represents a straight line coupling among the white circles, and a broken line represents an actual traveling trajectory. Comparing the solid line with the broken line, when only the certain actual distance trajectory points D1-D4 are shown as the trajectory figure, difference between the ideal trajectory determined by the trajectory figure and the actual traveling trajectory becomes large. Thus, it is difficult for the user to analyze the actual traveling trajectory based on the ideal trajectory determined by the trajectory figure.

Here, when only the certain actual distance trajectory points D1-D4 are shown as the trajectory figure, and the distance between two adjacent certain actual distance trajectory points D1-D4 becomes short, the user may easily analyze the actual traveling trajectory based on the ideal trajectory determined by the trajectory figure. However, in FIGS. 4 to 7, only the trajectory figure is shown, and the map is not shown. Actually, the trajectory figure is superimposed over the map, which includes a road, a geological formation, a building and the like. Since the map includes various information, the map with the trajectory figure is very confusing. Thus, it is preferable to reduce the number of points in the trajectory figure. Thus, in the present embodiment, both of the certain actual distance trajectory points D1-D4 and the direction change points E1-E3 in the trajectory figure are shown without shortening the distance between two adjacent certain actual distance trajectory points D1-D4 in order to increase the number of the certain actual distance trajectory points D1-D4.

In the present embodiment, the display device 10 displays the trajectory figure including both of the certain actual distance trajectory points D1-D4 and the direction change points E1-E3. The certain actual distance trajectory points D1-D4 are points arranged at every certain actual distance, which is defined by the scale of the map. When the scale of the map is small, the certain actual distance becomes long. Accordingly, even when the scale of the map is small, the distance on the display device 10 between two adjacent points in the trajectory figure corresponding to the certain actual distance trajectory points is not narrowed. As a result, even when the scale of the map is small, it is not hard to see the trajectory figure. Further, since the trajectory figure includes the direction change points E1-E3, the user can easily recognize the actual trajectory based on the trajectory figure. When the user easily recognize the actual trajectory based on the trajectory figure, it is useful for confirming the trajectory when the vehicle drives on an off road.

Second Embodiment

Next, a second embodiment will be explained. In the first embodiment, all points arranged at every certain actual distance of the control circuit 8 constitute the candidate points of the direction change point. In the second embodiment, points arranged at every certain actual distance, which are set with respect to a scale of the map that is larger than the current scale of the map displayed on the display device 10, are set to the candidate points of the direction change point.

Figure 8:
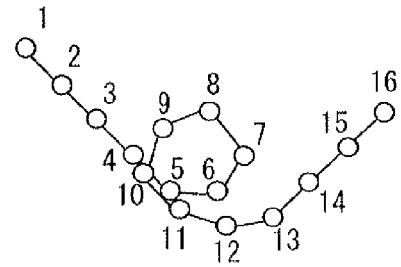
FIG. 8 is a diagram explaining an internal process for displaying a trajectory figure according to a second embodiment.

FIG. 8 shows the trajectory figure for explaining an internal process according to the second embodiment. Specifically, the certain actual distance trajectory points 1-16 arranged at every certain actual distance, which are set with respect to the scale of the map that is larger than the current scale of the map displayed on the display device 10, constitute the trajectory figure. Specifically, the certain actual distance trajectory points 1-16 in the trajectory figure are arranged at every certain actual distance, which is narrower than the certain actual distance defined by the current scale of the map displayed on the display device 10. Here, when the trajectory figure with the certain actual distance trajectory points 1, 3, 5, 7, 9, 11, 13, 15 arranged at every wider actual distance, which is defined by the current scale of the map displayed on the display device 10, is compared with the trajectory figure with the certain actual distance trajectory points 1-16 arranged at every narrower actual distance, which is defined by the larger scale of the map, the certain actual distance trajectory points 1, 3, 5, 7, 9, 11, 13, 15 are prepared by thinning the certain actual distance trajectory points 1-16. When the trajectory figure with the certain actual distance trajectory points 1-16 is compared with the trajectory figure with the certain actual distance trajectory points 1, 3, 5, 7, 9, 11, 13, 15, the certain actual distance trajectory points 1-16 faithfully represents the actual trajectory. Specifically, the certain actual distance trajectory points 1-16 defined by the larger scale of the map are more densely displayed than the certain actual distance trajectory points 1, 3, 5, 7, 9, 11, 13, 15. Further, in FIG. 8, the order of the number of points 1-16 represents the stored order of points. As shown in FIG. 8, the traveling direction of the vehicle rotates 360 degrees from the certain actual distance trajectory point No. 4 to the certain actual distance trajectory point No. 11 via the certain actual distance trajectory points No. 5-10.

Figure 9:
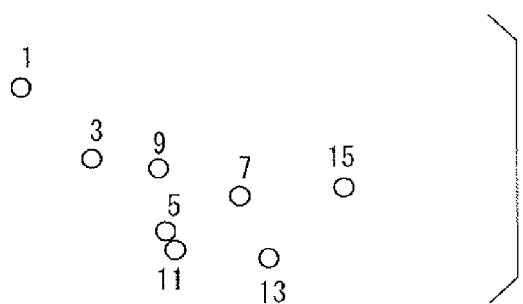
FIG. 9 is a diagram showing a trajectory figure according to a comparison device.

FIG. 9 shows a comparison trajectory figure with respect to FIG. 8. Specifically, the trajectory figure in FIG. 9 includes the certain actual distance trajectory points 1, 3, 5, 7, 9, 11, 13, 15, which are arranged at every wider actual distance defined by the current scale of the map displayed on the display device 10. Here, the numeral of the certain actual distance trajectory points in FIG. 9 corresponds to the numeral of the certain actual distance trajectory points in FIG. 8. The certain actual distance defined by the current scale of the map displayed on the display device 10 is twice larger than the certain actual distance in FIG. 8. Accordingly, only the odd number certain actual distance trajectory points 1, 3, 5, 7, 9, 11, 13, 15 in the trajectory figure are shown in FIG. 9. Even when the user see the trajectory figure in FIG. 9, it is difficult to confirm that the traveling direction of the vehicle rotates 360 degrees.

Figure 10:
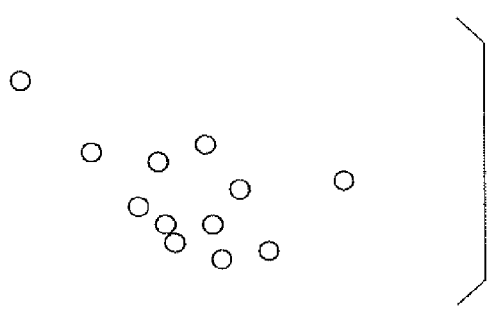
FIG. 10 is a diagram showing a display image of a trajectory figure according to the second embodiment.

FIG. 10 shows the trajectory figure according to the second embodiment. Although the number of the certain actual distance trajectory points is not shown in FIG. 10, the trajectory figure in FIG. 10 is prepared by adding the certain actual distance trajectory points No. 6, No. 8, No. 10 and No. 12 in FIG. 8 as the direction change points into the certain actual distance trajectory points 1, 3, 5, 7, 9, 11, 13, 15 in FIG. 9. When the user see the trajectory figure in FIG. 10, it is possible for the user to confirm that the traveling direction of the vehicle rotates 360 degrees.

In the second embodiment, the display device 10 displays the trajectory figure including both of the certain actual distance trajectory points and the direction change points. Accordingly, even when the scale of the map is small, it is not hard to see the trajectory. Further, the user can easily recognize the actual trajectory based on the trajectory figure.

The second embodiment may be modified as follows. Specifically, the certain actual distance trajectory points corresponding to the current scale of the map displayed on the display device 10 may be displayed in an area other than the direction change points. The certain actual distance trajectory points corresponding to the larger scale of the map, which is larger than the current scale of the map displayed on the display device 10 may be displayed in the area of the direction change points.

In the above case, in the area other than the direction change points, the trajectory figure is roughly displayed. In the area of the direction change points, the trajectory figure is densely displayed. Specifically, a part of the trajectory figure in the area of the direction change points is displayed in detail, compared with the other part of the trajectory figure. It is comparatively difficult for the user to confirm the traveling direction of the vehicle in the part of the trajectory figure in the area of the direction change points. Thus, even when the scale of the map is small, it is not hard to see the trajectory figure, and further, the user can easily recognize the actual trajectory based on the trajectory figure.

Third Embodiment

Next, a third embodiment will be explained. In the first and second embodiments, the position determination unit 82 determines the certain actual distance trajectory point and the direction change point according to the positions stored as the current position in the external memory 9. The display control unit 83 displays the trajectory figure at the direction change points and the certain distance trajectory points on the map displayed on the display device 10. In the present embodiment, the position determination unit 82 determines certain display distance trajectory points based on the points that are stored in the external memory 9 as the current position. The certain display distance trajectory points are arranged at every certain display distance, which is determined as the distance of the map on the display device 10 in such a manner that it is not hard to see the trajectory figure and the user can easily recognize the actual trajectory based on the trajectory figure. The display control unit 83 displays the trajectory figure at the certain display distance trajectory points, which are determined by the position determination unit 82.

Specifically, in the present embodiment, the position determination unit 82 reversely calculates the actual distance according to the scale such as 1/20000 of the map displayed on the display device 10, the actual distance corresponding to multiple predetermined dots such as four dots in such a manner that it is not hard to see the trajectory figure on the display device 10 and the user can easily recognize the actual trajectory based on the trajectory figure. With using the reversely calculated actual distance, the position determination unit 82 determines the certain display distance trajectory points based on the points that are stored in the external memory 9 as the current position. The predetermined dots correspond to the certain display distance.

Figure 11:
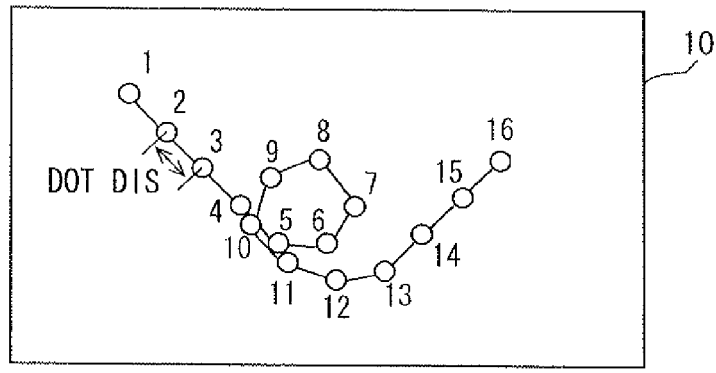
FIG. 11 is a diagram showing a display image of a trajectory figure according to a third second embodiment.
Figure 12:
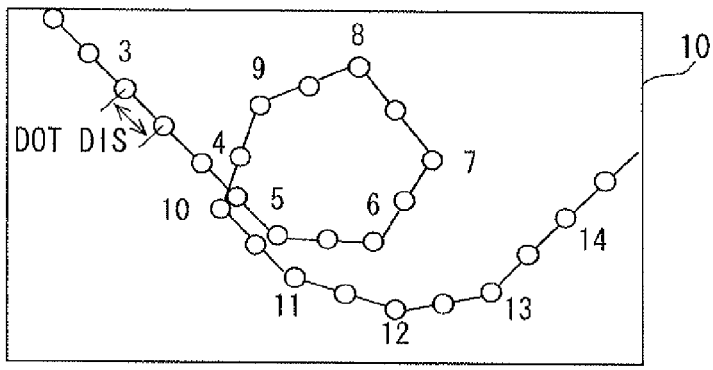
FIG. 12 is a diagram showing a display image of a trajectory figure according to a modification of the third embodiment.

FIG. 11 shows a display example of the trajectory figure according to the third embodiment. In FIG. 11, the number of certain display distance trajectory points 1-16 is the stored order of the points. As shown in FIG. 11, the traveling direction of the vehicle rotates 360 degrees from the certain display distance trajectory point No. 4 to the certain display distance trajectory point No. 11 via the certain display distance trajectory points No. 5-10. Further, FIG. 12 is another display example of the trajectory figure. The scale of the map in FIG. 12 is a half of the scale of the map in FIG. 11. As shown in FIG. 12, the traveling direction of the vehicle rotates 360 degrees from the certain display distance trajectory point No. 4 to the certain display distance trajectory point No. 11 via the certain display distance trajectory points No. 5-10.

Thus, in the third embodiment, the display device 10 displays the trajectory figure including the certain display distance trajectory points 1-16 arranged at every certain display distance, which is determined as the distance of the map on the display device 10 in such a manner that it is not hard to see the trajectory figure and the user can easily recognize the actual trajectory based on the trajectory figure. Accordingly, even when the scale of the map is small, it is not hard to see the trajectory figure, and further, the user can easily recognize the actual trajectory based on the trajectory figure.

Fourth Embodiment

Figure 13:
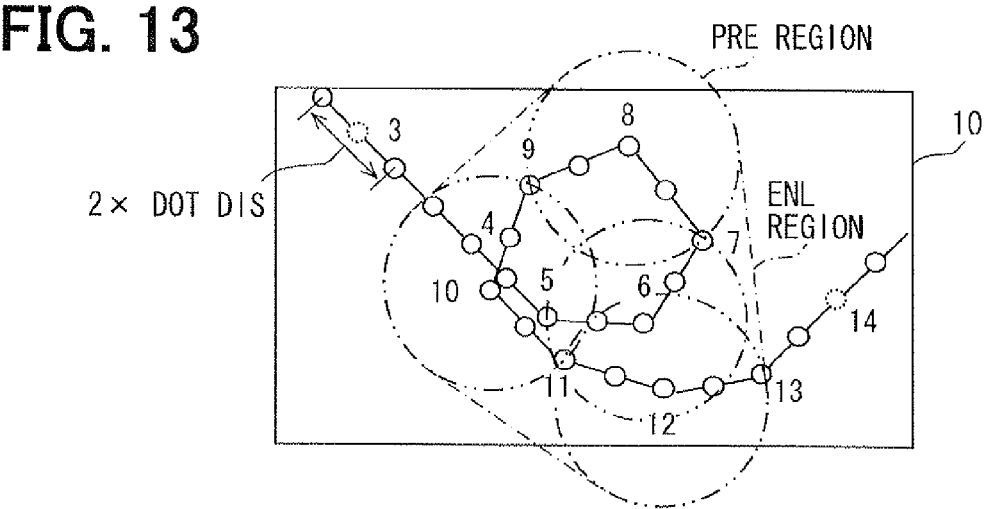
FIG. 13 is a diagram showing a display image of a trajectory figure according to a fourth embodiment.

Next, a fourth embodiment will be explained. In the fourth embodiment, the position determination unit 82 determines certain display distance trajectory points in such a manner that a predetermined dot distance in a region that is defined by a circle around the direction change point as a center of the circle is shorter than a predetermined dot distance in other region. Here, the direction change point is determined by the position determination unit 82. Specifically, as shown in FIG. 13, the dot distance in the region within the circle around the direction change point is shorter than the dot distance in other region disposed outside of the circle around the direction change point. For example, the dot distance in the region within the circle around the direction change point is a half of the dot distance in other region disposed outside of the circle around the direction change point. Further, the position determination unit 82 sets the direction change point determined by the position determination unit 82 as the certain display distance trajectory point.

Specifically, the position determination unit 82 determines the direction change point, at which the vehicle changes it's traveling direction. Next, in the region that is defined by a circle around the determined direction change point as a center, the position determination unit 82 reversely calculates the actual distance corresponding to the predetermined dots such as four dots on the display screen of the display device 10 based on the scale of the map. With using the reversely calculated actual distance, the position determination unit 82 determines the certain display distance trajectory points in the region within the circle based on the points that are stored in the external memory 9 as the current position. Further, in the other region disposed outside of the circle around the determined direction change point as a center, the position determination unit 82 reversely calculates the actual distance corresponding to predetermined dots such as eight dots on the display screen of the display device 10. With using the reversely calculated actual distance, the position determination unit 82 determines the certain display distance trajectory points in the other region disposed outside of the circle based on the points that are stored in the external memory 9 as the current position. Here, the region within the circle around the direction change point as a center has a radius such as eight dots.

The position determination unit 82 sets an enlarged region including multiple regions when there are multiple direction change points, and the multiple regions corresponding to the direction change points are partially overlapped. The enlarged region is surrounded with the circles and tangent lines of the circles. The dot distance in the other region of the enlarged region is set to be longer than the dot distance in the enlarged region.

FIG. 13 shows a display example of the trajectory figure according to the fourth embodiment. In FIG. 13, there are four direction change points No. 6, No, 8, No. 10 and No. 12. Four circles shown as a two-dot chain line correspond to the region that is defined by a circle around the determined direction change point as a center. Further, since four circles are partially overlapped, the region shown as a dot chain line and surrounded with the four circles and the tangent lines corresponds to the enlarged region. The dot distance in the enlarged region is four dots, and the dot distance in the other region outside of the enlarged region is eight dots, which are twice longer than the dot distance in the enlarged region.

Thus, when the position determination unit 82 determines the certain display distance trajectory points, the position determination unit 82 sets the dot distance in the region of the circle around the direction change point as the center to be shorter than the dot distance in the other region outside of the circle. Thus, the certain display distance trajectory points in the region around the direction change point are densely displayed, and the certain display distance trajectory points in the other region outside of the circle are displayed roughly. In this case, it is not hard to see the trajectory figure, and further, the user can easily recognize the actual trajectory based on the trajectory figure.

When the position determination unit 82 determines the certain display distance trajectory points, the position determination unit 82 sets the dot distance in the region of the circle around the direction change point as the center to be maintained to an original dot distance such as four dots, and the position determination unit 82 sets the dot distance in the other region outside of the circle to be longer than the original dot distance such as eight dots.

Alternatively, the position determination unit 82 may set the dot distance in the region of the circle around the direction change point as the center to be shorter than the original dot distance such as two dots, and the position determination unit 82 may set the dot distance in the other region outside of the circle to be maintained to the original dot distance such as four dots. Alternatively, the position determination unit 82 may set the dot distance in the region of the circle around the direction change point as the center to be shorter than the original dot distance such as two dots, and the position determination unit 82 may set the dot distance in the other region outside of the circle to be longer than the original dot distance such as eight dots.

The certain actual distance or the certain display distance may be changed according to an area shown in the map, a display mode or the like. Specifically, when the map represents a downtown area so that multiple buildings and multiple landmarks are shown in the map densely, the certain actual distance or the certain display distance may be determined not to overlap with the buildings and the landmarks.

Preferably, the trajectory figure is displayed over the map not to overlap over only a famous landmark and a point of interest (i.e., POI) that the user preliminarily set, and the trajectory figure is superimposed over other buildings and landmarks.

In this case, the visibility of the trajectory figure for the user is improved although it is not hard for the user to see the display image on the display device 10.

In the fourth embodiment, when there are multiple direction change points, and the regions defined by the direction change points are partially overlapped with each other, the dot distance (i.e., display distance) in the overlapped portion of the regions may be narrower than the dot distance in the region other than the overlapped portion.

In the above case, the trajectory figure in the overlapped portion is densely displayed. The trajectory figure in the region other than the overlapped portion is comparatively roughly displayed. The trajectory figure in the other region is much roughly displayed. Thus, the trajectory figure is displayed roughly according to a distance from the direction change point. Specifically, when the trajectory figure is dense, the points are densely displayed. When the trajectory figure is rough, the points are roughly displayed. Thus, the user can easily recognize the display image, and further, the visibility of the trajectory figure is improved.

The above disclosure has the following aspects.

According to a first aspect of the present disclosure, a trajectory display device includes: a display element for displaying a trajectory of a moving body and a map; a current position detector for detecting a current position of the moving body successively; a memory for storing the current position successively so that a plurality of position data is stored; and a position determination unit for determining a plurality of certain actual distance trajectory points and a plurality of direction change points based on the position data stored in the memory. The certain actual distance trajectory points are arranged at every actual distance. The actual distance is defined by a first scale of the map displayed on the display element in such a manner that the actual distance in case that the first scale of the map is small is longer than the actual distance in case that the first scale of the map is large. The moving body changes a moving direction at each direction change point. The display element displays the trajectory including the certain actual distance trajectory points and the direction change points, which is overlapped over the map.

In the above device, the actual distance becomes long as the scale of the map is small. Accordingly, even when the scale of the map is small, a display distance on the display element between two adjacent certain actual distance trajectory points is sufficiently large so that the user can recognize the trajectory, i.e., the trajectory is easily viewable for the user even when the scale of the map is small. Further, the user can determine an actual trajectory even when the scale of the map is small.

Alternatively, the position determination unit may select a part of the position data stored in the memory as candidate points of each direction change point. A distance between two adjacent candidate points is narrower than a distance between two adjacent certain actual distance trajectory points. The position determination unit further selects three successive candidate points, and the position determination unit determines based on a traveling direction change at a center of the three successive candidate points whether the center of the three successive candidate points is the direction change point. In this case, since the direction change point is determined among the candidate points, which are arranged at every distance narrower than the actual distance of the certain actual distance trajectory points, the determined direction change point approaches an actual direction change position of the vehicle. Thus, the trajectory on the display element approaches the actual trajectory.

Further, the current position detector may detect the current position at predetermined time intervals. One end of the three successive candidate points and the center of the three successive candidate points provide a first vector, and the center of the three successive candidate points and the other end of the three successive candidate points provide a second vector, and the position determination unit determines that the center of the three successive candidate points is the direction change point when an angle between the first vector and the second vector is equal to or larger than a predetermined threshold.

Alternatively, the position determination unit may not determine the direction change points when the first scale of the map is equal to or smaller than a predetermined scale. In this case, when the scale of the map is small, the trajectory is displayed roughly. However, when the scale of the map is small, the map on the display element is also roughly displayed. Thus, even when the display element displays only the certain actual distance trajectory points, the user can recognize the trajectory as much as the roughly displayed map. Further, since the position determination unit does not determine the direction change points, a process in the trajectory display device is simplified.

Further, the display element may display the trajectory including only the certain actual distance trajectory points when the first scale of the map is equal to or smaller than a predetermined scale.

Alternatively, the position determination unit may define a second scale, which is larger by one step than the first scale. The position determination unit selects a part of the position data stored in the memory. Positions in the part of the position data are arranged at every actual distance, which is defined by the second scale. The position determination unit determines each direction change point based on the part of the position data. In this case, the trajectory is displayed roughly in an area in which the moving body does not change the moving direction. The trajectory is displayed in detail in an area in which the moving body changes the moving direction. Specifically, the trajectory in the area, in which it is comparatively difficult to recognize the trajectory, is displayed in detail, compared with other area. Thus, even when the scale of the map is small, the user can recognize the trajectory. The trajectory is easily viewable for the user even when the scale of the map is small. Further, the user can determine an actual trajectory even when the scale of the map is small.

According to a second aspect of the present disclosure, a trajectory display device includes: a display element for displaying a trajectory of a moving body and a map; a current position detector for detecting a current position of the moving body successively; a memory for storing the current position successively so that a plurality of position data is stored; and a position determination unit for determining a plurality of certain display distance trajectory points based on the position data stored in the memory. The certain display distance trajectory points are arranged at every actual distance corresponding to a display distance. The display element displays the trajectory including the certain display distance trajectory points, which is overlapped over the map. The display distance is defined by a distance of a display screen of the display element in such a manner that a user recognizes the trajectory prepared by the display distance.

In the above device, the display element displays the trajectory of the certain display distance trajectory points. The user recognizes the trajectory prepared by the display distance, so that it is not hard to see the trajectory, and the trajectory is easily viewable for the user even when the scale of the map is small. Further, the user can determine an actual trajectory even when the scale of the map is small.

Alternatively, the position determination unit may calculate the actual distance according to the display distance and a scale of the map displayed on the display element, and the display distance is preliminary determined according to dimensions of the display screen. Further, when the trajectory is prepared by the display distance, the user can easily distinguish the trajectory.

Alternatively, the position determination unit may determine a plurality of direction change points based on the plurality of certain display distance trajectory points. The moving body changes a moving direction at each direction change point. The position determination unit determines a first part of the certain display distance trajectory points, which are disposed in a region within a circle around each direction change point as a center of the circle having a predetermined diameter. The position determination unit determines a second part of the certain display distance trajectory points, which are disposed outside of the region. The position determination unit changes the display distance of the second part of the certain display distance trajectory points to be longer than the display distance of the first part of the certain display distance trajectory points. Thus, the certain display distance trajectory points in the region within the circle around each direction change point are displayed in detail. The certain display distance trajectory points in the other region are displayed roughly. Here, the direction change point may be one of the certain display distance trajectory points. The display distance is constant in a certain portion of a whole actual trajectory.

Alternatively, the position determination unit may maintain the display distance of the first part of the certain display distance trajectory points.

Alternatively, the position determination unit may maintain the display distance of the second part of the certain display distance trajectory points, and the position determination unit changes the display distance of the first part of the certain display distance trajectory points to be shorter than the display distance of the second part of the certain display distance trajectory points.

Alternatively, the position determination unit may select a part of the position data stored in the memory as candidate points of each direction change point. A distance between two adjacent candidate points is narrower than a distance between two adjacent certain display distance trajectory points. The position determination unit further selects three successive candidate points. The position determination unit determines based on a traveling direction change at a center of the three successive candidate points whether the center of the three successive candidate points is the direction change point. In this case, since the direction change point is determined among the candidate points, which are arranged at every distance narrower than the actual distance of the certain actual distance trajectory points, the determined direction change point approaches an actual direction change position of the vehicle. Thus, the trajectory on the display element approaches the actual trajectory.

Further, the current position detector may detect the current position at predetermined time intervals. One end of the three successive candidate points and the center of the three successive candidate points provide a first vector, and the center of the three successive candidate points and the other end of the three successive candidate points provide a second vector. The position determination unit determines that the center of the three successive candidate points is the direction change point when an angle between the first vector and the second vector is equal to or larger than a predetermined threshold.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A trajectory display device comprising:
a display element for displaying a trajectory of a moving body and a map;
a current position detector for detecting a current position of the moving body successively;
a memory for storing the current position successively so that a plurality of position data is stored; and
a position determination processing device for determining a plurality of certain actual distance trajectory points and a plurality of direction change points based on the position data stored in the memory,
wherein the certain actual distance trajectory points are arranged at every actual distance,
wherein the actual distance is defined by a first scale of the map displayed on the display element in such a manner that the actual distance in case that the first scale of the map is small is longer than the actual distance in case that the first scale of the map is large,
wherein the moving body changes a moving direction at each direction change point,
wherein the display element displays the trajectory including the certain actual distance trajectory points and the direction change points, which is overlapped over the map,
wherein each direction change point is different from the certain actual distance trajectory points,
wherein the position determination processing device selects a part of the position data stored in the memory as candidate points of each direction change point,
wherein a distance between two adjacent candidate points is narrower than a distance between two adjacent certain actual distance trajectory points,
wherein the position determination processing device further selects three successive candidate points, and
wherein the position determination processing device determines based on a traveling direction change at a center of the three successive candidate points whether the center of the three successive candidate points is the direction change point.

2. The trajectory display device according to claim 1,
wherein the current position detector detects the current position at predetermined time intervals,
wherein one end of the three successive candidate points and the center of the three successive candidate points provide a first vector, and the center of the three successive candidate points and the other end of the three successive candidate points provide a second vector, and
wherein the position determination processing device determines that the center of the three successive candidate points is the direction change point when an angle between the first vector and the second vector is equal to or larger than a predetermined threshold.

3. The trajectory display device according to claim 1,
wherein the position determination processing device does not determine the direction change points when the first scale of the map is equal to or smaller than a predetermined scale.

4. The trajectory display device according to claim 3,
wherein the display element displays the trajectory including only the certain actual distance trajectory points when the first scale of the map is equal to or smaller than the predetermined scale.

5. The trajectory display device according to claim 1,
wherein the position determination processing device defines a second scale, which is larger by one step than the first scale,
wherein the position determination processing device selects a part of the position data stored in the memory,
wherein positions in the part of the position data are arranged at every actual distance, which is defined by the second scale, and
wherein the position determination processing device determines each direction change point based on the part of the position data.

6. A trajectory display device comprising:
a display element for displaying a trajectory of a moving body and a map;
a current position detector for detecting a current position of the moving body successively;
a memory for storing the current position successively so that a plurality of position data is stored; and
a position determination processing device for determining a plurality of certain display distance trajectory points based on the position data stored in the memory,
wherein the certain display distance trajectory points are arranged at every actual distance corresponding to a display distance,
wherein the display element displays the trajectory including the certain display distance trajectory points, which is overlapped over the map,
wherein the display distance is defined by a distance of a display screen of the display element in such a manner that an user recognizes the trajectory prepared by the display distance
wherein the position determination processing device determines a plurality of direction change points based on the plurality of certain display distance trajectory points,
wherein the moving body changes a moving direction at each direction change point,
wherein the position determination processing device determines a first part of the certain display distance trajectory points, which are disposed in a region within a circle around each direction change point as a center of the circle having a predetermined diameter,
wherein the position determination processing device determines a second part of the certain display distance trajectory points, which are disposed outside of the region, and
wherein the position determination processing device changes the display distance of the second part of the certain display distance trajectory points to be longer than the display distance of the first part of the certain display distance trajectory points.

7. The trajectory display device according to claim 6,
wherein the position determination processing device calculates the actual distance according to the display distance and a scale of the map displayed on the display element, and
wherein the display distance is preliminary determined according to dimensions of the display screen.

8. The trajectory display device according to claim 7,
wherein, when the trajectory is prepared by the display distance, the user can easily distinguish the trajectory.

9. The trajectory display device according to claim 6,
wherein the position determination processing device maintains the display distance of the first part of the certain display distance trajectory points.

10. The trajectory display device according to claim 6,
wherein the position determination processing device maintains the display distance of the second part of the certain display distance trajectory points, and
wherein the position determination processing device changes the display distance of the first part of the certain display distance trajectory points to be shorter than the display distance of the second part of the certain display distance trajectory points.

11. The trajectory display device according to claim 6,
wherein the position determination processing device selects a part of the position data stored in the memory as candidate points of each direction change point,
wherein a distance between two adjacent candidate points is narrower than a distance between two adjacent certain display distance trajectory points,
wherein the position determination processing device further selects three successive candidate points, and
wherein the position determination processing device determines based on a traveling direction change at a center of the three successive candidate points whether the center of the three successive candidate points is the direction change point.

12. The trajectory display device according to claim 11,
wherein the current position detector detects the current position at predetermined time intervals,
wherein one end of the three successive candidate points and the center of the three successive candidate points provide a first vector, and the center of the three successive candidate points and the other end of the three successive candidate points provide a second vector, and
wherein the position determination processing device determines that the center of the three successive candidate points is the direction change point when an angle between the first vector and the second vector is equal to or larger than a predetermined threshold.

13. A trajectory display device comprising:
a display element for displaying a trajectory of a moving body and a map;
a current position detector for detecting a current position of the moving body successively;
a memory for storing the current position successively so that a plurality of position data is stored; and
a position determination processing device for determining a plurality of certain actual distance trajectory points and a plurality of direction change points based on the position data stored in the memory,
wherein the certain actual distance trajectory points are arranged at every actual distance,
wherein the actual distance is defined by a first scale of the map displayed on the display element in such a manner that the actual distance in case that the first scale of the map is small is longer than the actual distance in case that the first scale of the map is large,
wherein the moving body changes a moving direction at each direction change point,
wherein the display element displays the trajectory including the certain actual distance trajectory points and the direction change points, which is overlapped over the map,
wherein the position determination processing device selects a part of the position data stored in the memory as candidate points of each direction change point,
wherein a distance between two adjacent candidate points is narrower than a distance between two adjacent certain actual distance trajectory points,
wherein the position determination processing device further selects three successive candidate points, and
wherein the position determination processing device determines based on a traveling direction change at a center of the three successive candidate points whether the center of the three successive candidate points is the direction change point.

14. A trajectory display device comprising:
a display element for displaying a trajectory of a moving body and a map;
a current position detector for detecting a current position of the moving body successively;
a memory for storing the current position successively so that a plurality of position data is stored; and
a position determination processing device for determining a plurality of certain actual distance trajectory points and a plurality of direction change points based on the position data stored in the memory,
wherein the certain actual distance trajectory points are arranged at every actual distance,
wherein the actual distance is defined by a first scale of the map displayed on the display element in such a manner that the actual distance in case that the first scale of the map is small is longer than the actual distance in case that the first scale of the map is large,
wherein the moving body changes a moving direction at each direction change point,
wherein the display element displays the trajectory including the certain actual distance trajectory points and the direction change points, which is overlapped over the map, and
wherein the position determination processing device does not determine the direction change points when the first scale of the map is equal to or smaller than a predetermined scale.

* * * * *